No. 618,522. Patented Jan. 31, 1899.
D. REYNOLDS.
MEANS FOR PURIFYING LIQUIDS.
(Application filed July 6, 1897.)
(No Model.) 2 Sheets—Sheet 1.
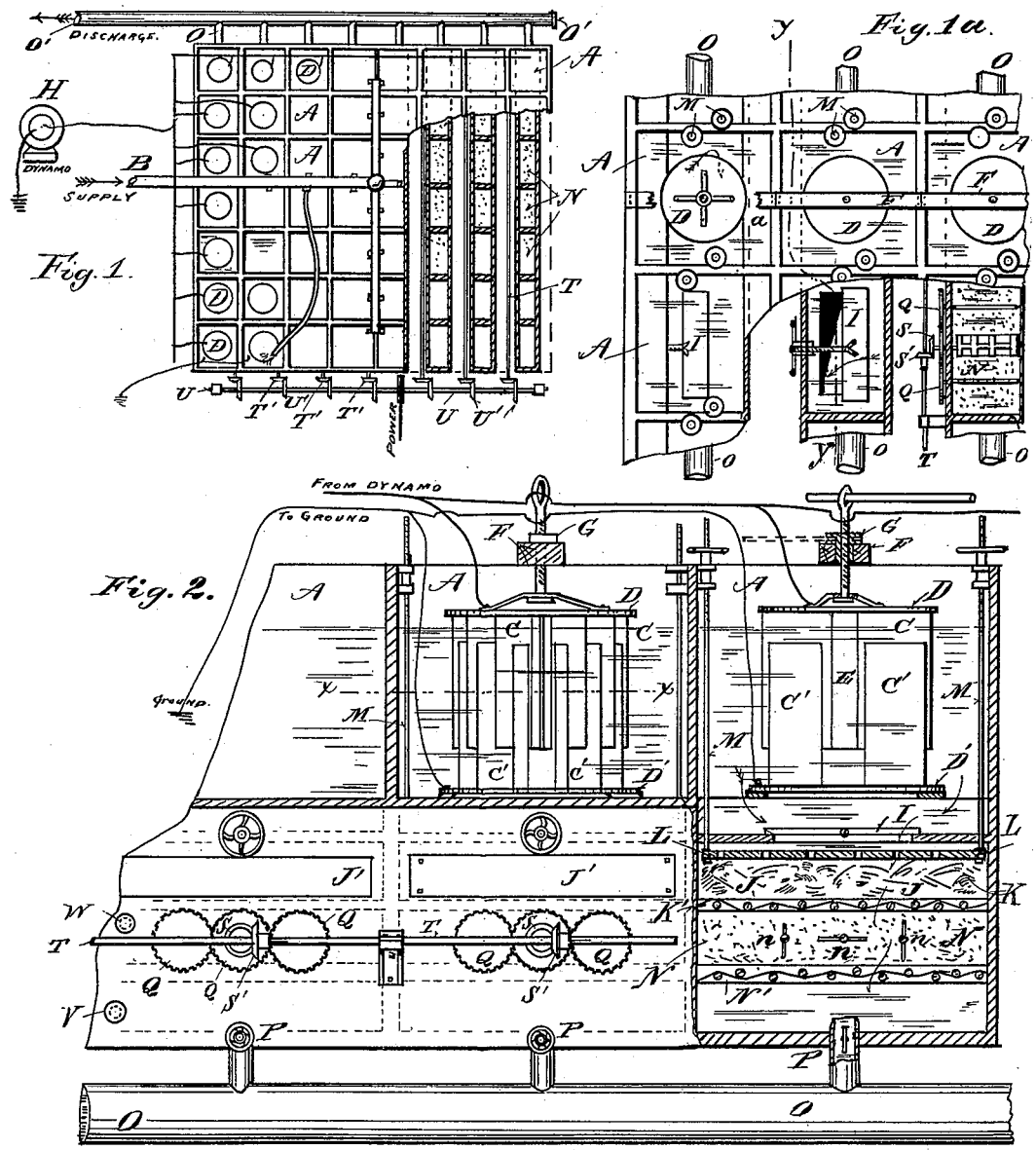
WITNESSES:
B. M. Clifton
Jas. C. Hazlett
INVENTOR
Dexter Reynolds
BY
H. M. Plaisted.
ATTORNEY.

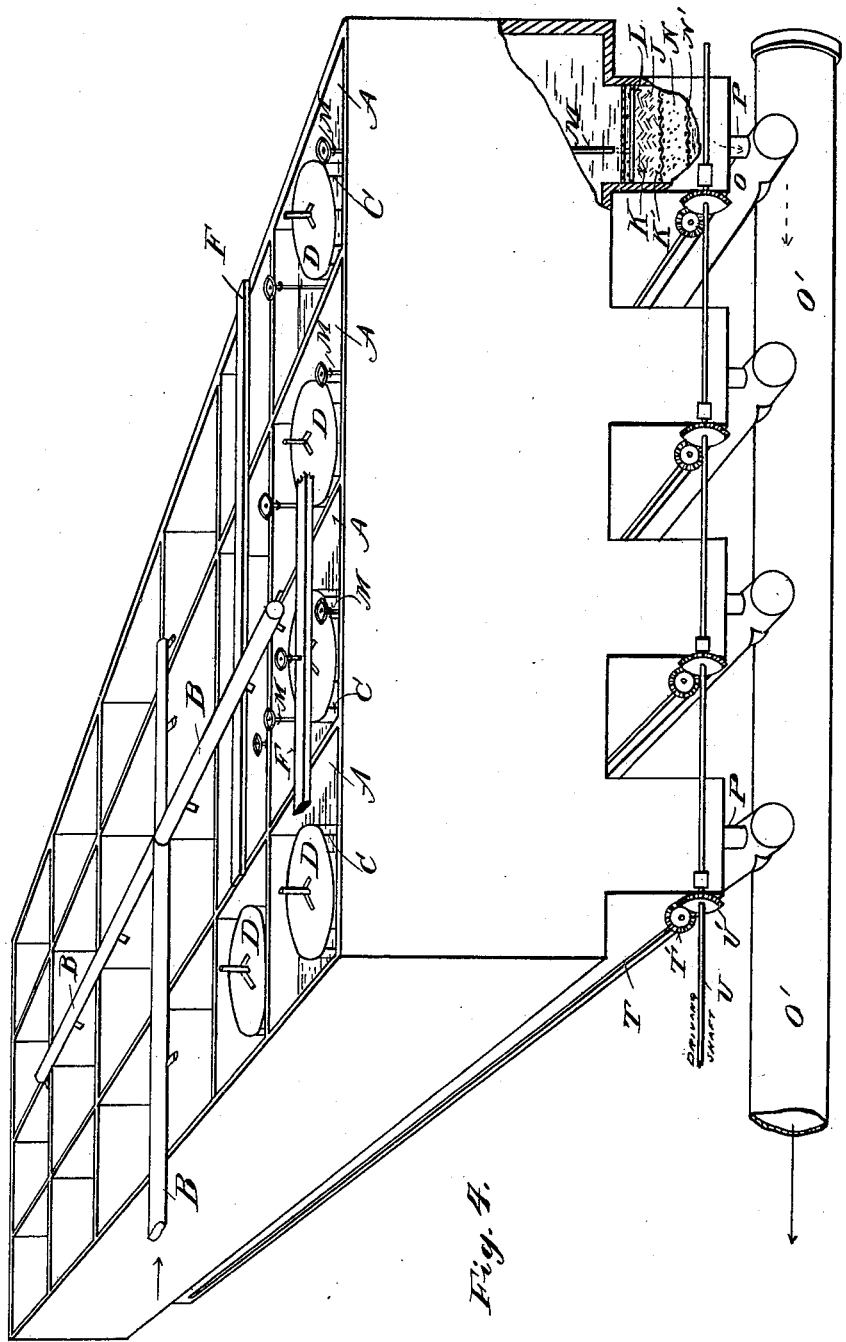

UNITED STATES PATENT OFFICE.

DEXTER REYNOLDS, OF ST. LOUIS, MISSOURI.

MEANS FOR PURIFYING LIQUIDS.

SPECIFICATION forming part of Letters Patent No. 618,522, dated January 31, 1899.

Original application filed April 3, 1897, Serial No. 630,598. Divided and this application filed July 6, 1897. Serial No. 643,645.
(No model.)

*To all whom it may concern:*

Be it known that I, DEXTER REYNOLDS, a citizen of the United States, residing at St. Louis, in the State of Missouri, have invented certain new and useful Improvements in Means for Purifying Liquids, of which the following is a specification, reference being had therein to the accompanying drawings.

This invention relates to certain new and useful improvements in means for purifying liquids, being especially adapted to effect the rapid purification of large quantities of water to supply cities and other communities, the peculiarities of which will be hereinafter described and claimed.

In the accompanying drawings, on which like reference-letters indicate corresponding parts, Figure 1 represents a plan view of a series of compartments exemplifying my system; Fig. 1$^a$, a plan view of several compartments with portions broken to show the strainer attachments and on a larger scale than Fig. 1; Fig. 2, a partial sectional view, enlarged, of one electric filtering-compartment and its strainer attachment on the line $y\ y$, Fig. 1$^a$; Fig. 3, a horizontal section of a special form of telescoping electrodes preferably used, the section being taken on the line X X of Fig. 2; and Fig. 4, a perspective view of the general construction of the upper and lower compartments by themselves and partly in section.

This specification is a division of my application similarly headed and filed April 3, 1897, Serial No. 630,598, containing an application of my principle of the purification of large bodies of water by themselves, such as naturally located in ponds or lakes. Thus in my construction shown in Fig. 1 I have provided a series of compartments holding in themselves as much as would be contained in a pond of like size, but have so divided up the cubic contents of such body of water that the filtration can go forward rapidly and effectively in all parts of it at the same time, or, if it be necessary, one or more compartments may be shut off for cleaning them without disturbing the operation of the remainder. Each compartment is provided with a pair of electrodes adapted to telescope more or less with each other and consisting of a large number of plates, preferably radially disposed, whereby a large amount of area for the electrical communication, as well as the increase or decrease of such area, is provided. Thus the electric current will find its main point of discharge through the cathode electrode, thereby acting upon the interposed and adjacent water, and whereby the insulation of the tank or compartments is not necessary for the effective action of the electrodes upon the water.

Referring to the drawings, the letter A designates the compartments, forming a series of tanks adjacent to one another and supplied independently from the water-main B and its branches having nozzles to supply the adjacent compartments, to one of which nozzles may be attached a hose to supply the more distant compartments, as indicated. The said pipes and tanks may be made of boiler-iron or other suitable material. In each tank is a pair of electrodes, the preferred form of which is that illustrated in the figures, consisting of a series of plates C C', respectively, the former depending from a common disk or top D and surrounding a cylinder E and the latter rising from a base-plate D', supported at or near the bottom of the tank in any suitable manner. Fig. 3 shows a horizontal section illustrating the intermatching of the plates C and C' and their telescoping action. The anode or upper electrode is supported from the cross-bar F or otherwise and has a rotatably-adjustable sleeve G, by which the vertical position of the anode may be varied, and similarly varying the position of the plates with respect to each other. The sleeve G has holes or projections by which a bar inserted therein, as indicated by dotted lines in Fig. 2, will rotate it, and thus raise or lower the anode by the screw-threaded engagement of the sleeve with the stem thereof. This stem, having the eye at the end, may also be rotated by a bar, as indicated in Fig. 2, and thus adjust the anode. Other means may be employed, however.

The anodes are suitably wired to a dynamo or other source of electricity H, Fig. 1, grounded on the cathode side, while the cathodes are likewise grounded, as shown by the figures. Suitable switches and other devices may be employed, as are required. The current of electricity overcomes the resistance of the water in each tank under the electric action and coagulates the dissolved impurities therein, which likewise inclose the mechanical impurities and settle to the bottom of the tank. An outlet-valve I is provided, through which the water and its impurities in their coagulated and separated state pass into a strainer, by which the mechanical filtration is quickly effected. This strainer consists of the compartment J, having a door J', giving access thereto and containing sponges or similar porous material K. This material may be compressed by a perforated plunger L, operated by rods M, Fig. 2, by which the porosity of the sponge or other material may be varied. Below the compartment J is another compartment N, containing coke or similar material, through which the water passes and then enters the discharge-pipe O. A valve P regulates the discharge-opening from the compartment N. A screen or other perforated partition K' N' forms the bottom of the respective compartments.

Within the compartment N are located a set of shafts $n$, having side fingers adapted to stir up the coke or other material when rotated by intermeshing gears Q or other operative means mounted on said shafts. One of the set is provided with a bevel S, adapted to be clutched by a driving-bevel S', slidingly mounted on a counter-shaft T, extending along the sides of the strainers, as shown in Fig. 1. A driving-shaft U is connected by bevels T' U' or otherwise to each counter-shaft. Any one of the compartments N under the respective tanks A may thus be stirred up for better action or washing the material contained. An inlet V for hose attachment and outlet-cocks W provide means for sending a stream reversely through the filtering material while thus acted on by the tumbler-shafts $n$.

Referring to Fig. 1, it will be seen that the screens are narrower than the width of the tanks above, whereby a long passage is left to give access to the different compartments. Thus a passage alternates with the mechanical filters, so that a person can pass under the compartment containing the electric filtering apparatus and change the sponges or other porous material and also the mineral matter in the lower compartments quite readily. The sliding gear on the shaft running along the passage can thus be easily coupled with the gears of the agitators, as indicated in Fig. 2. The discharge-pipes O under each line of tanks are in common to the pipe O', Fig. 1, from whence it is supplied to the consumers or delivered to any suitable reservoir.

The term "sponge material" is used to include all readily porous fibrous or other yielding material of a spongy porous compressible nature, of which the substance known to the trade as "sponge" is the best example. It is understood that it also includes other material not properly of the sponge species, but of a similar nature—such as sea-moss or fibrous material, either natural or manufactured, of various kinds—which will allow the ready percolation of the water through this mass, but will retain the jelly-like coagulated impurities transformed from the water by the action of the electric current in passing between the electrodes, as previously described.

Having thus fully described my invention, what I claim as new, and desire to secure by Letters Patent, is—

1. A system of filters comprising a series of compartments formed by a reservoir provided with intersecting partitions, lower compartments of lesser width and equal length, located respectively below the first-named compartments, and provided with regulated openings between said compartments, matching electrodes located in said upper compartments, one electrode wired to a source of electricity, and the other electrode grounded, filtering means located in said lower compartment, supply-pipes for liquid to be filtered, leading to said upper compartments, and discharge-pipes located below said lower compartments, and having valvular communications respectively therewith.

2. The herein-described system of filtering water consisting of a series of independent compartment-tanks, each tank having an outlet-opening, a pair of electrodes mounted in each tank and wired to a source of electricity suitably grounded, and to a ground connection respectively, a strainer located below the outlet-opening of the tank consisting of two compartments, the upper filled with sponge material to catch the coagulations, and the lower filled with mineral matter to catch the other impurities, a discharge-pipe communicating with each compartment-strainer, and a supply-pipe for each compartment-tank.

3. In a system of purifying liquid, a collection of compartment-tanks adjacently located, a supply-pipe for said tanks, a valve in the bottom of each tank, a pair of telescoping electrodes mounted in each tank, the anode wired to a dynamo or other source of electricity grounded on the cathode side, and the cathode suitably grounded, a mechanical filter consisting of compartments of less width than the tanks above forming passage-ways thereunder, and a common discharge-pipe communicating with said filters, substantially as shown and described.

4. A system of filtering liquid, consisting of a collection of adjacent compartments open at the top and provided with outlet-openings at the bottom, a supply-pipe for said compartments, a pair of electrodes and connections for each compartment, a mechanical filter below each compartment of same length but less width, each mechanical filter comprising a compartment containing sponge material, a perforated plunger and operative rods to press said sponge material, and a discharge-pipe, substantially as shown and described.

5. A system of compartment-tanks having common partition-walls and supply-pipe for each tank, a valve-regulated opening in the bottom of each tank, a pair of telescoping electrodes for each tank and suitable electrical connections therefor, a mechanical filter below each tank communicating with said valve-opening, and consisting of a compartment containing sponge material, a perforated plunger and compressing rods therefor, a lower compartment having mineral filtering material, an agitator for said mineral material, inlet and outlet connections for reverse current of liquid through said mineral material, a discharge valve and pipe communicating with each filter, substantially as shown and described.

6. In a system of purifying liquid consisting of a series of adjacent compartment-tanks A open at the top and each provided with a regulated outlet at the bottom, a supply-pipe for said tanks, telescoping electrodes consisting of intermatching plates adjustably mounted in each tank, and electrically wired to the ground, and a grounded source of electricity respectively, a sponge-compartment K beneath each tank provided with an adjustable perforated compressor L, a mineral filter below said sponge-compartment provided with agitators and means to operate them, inlet and outlet cocks for said filter, and a regulated discharge and collecting pipe for said filters, substantially as shown and described.

In testimony whereof I affix my signature in presence of two witnesses.

DEXTER REYNOLDS.

Witnesses:
ALFRED A. MATHEY,
W. H. NIEBLING.